United States Patent [19]
Yanagisawa

[11] Patent Number: 5,222,424
[45] Date of Patent: Jun. 29, 1993

[54] TWO DIMENSIONAL DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano, Japan

[21] Appl. No.: 946,089

[22] Filed: Sep. 17, 1992

[30] Foreign Application Priority Data

Sep. 23, 1991 [JP] Japan ................... 3-272035

[51] Int. Cl.$^5$ ............................. F01B 15/00
[52] U.S. Cl. ....................... 91/176; 91/196; 91/210; 92/66; 92/117 A; 92/136; 92/137; 92/146; 414/749
[58] Field of Search ............. 91/170 R, 176, 183, 91/196, 197, 210; 92/66, 117 R, , 117 A, 136, 137, 146, 161; 414/749

[56] References Cited

U.S. PATENT DOCUMENTS

| | | | |
|---|---|---|---|
| 3,568,575 | 3/1971 | Hagen | 92/66 X |
| 4,443,163 | 4/1984 | Gaither | 91/196 X |
| 4,456,077 | 6/1984 | Lagerstedt et al. | 92/117 R X |
| 4,776,745 | 10/1988 | Foley | 414/749 X |

FOREIGN PATENT DOCUMENTS

| | | | |
|---|---|---|---|
| 61-248902 | 6/1986 | Japan . | |
| 0770781 | 10/1980 | U.S.S.R. | 414/749 |
| 1042991 | 9/1983 | U.S.S.R. | 414/749 |

*Primary Examiner*—Edward K. Look
*Assistant Examiner*—Hoang Nguyen

[57] ABSTRACT

An object of the present invention is to provide a two dimensional drive system driven by fluid pressure. The drive system of the present invention comprises: a pair of X-guides; a pair of Y-guides; an X-rod whose each end is slidably attached to each Y-guide; a Y-rod whose each end is slidably attached to each X-guide; an X-piston section being provided at the midway of the X-rod; a Y-piston section being provided at the midway of the Y-rod; and a moving body having an X-chamber through which the X-rod is pierced and a Y-chamber through which the Y-rod is pierced, the X-chamber being divided into two subchambers by the X-piston section, the Y-chamber being divided into two subchambers by the Y-piston section. With this structure, the moving body is capable of moving in a plane by selectively supplying fluid to each subchamber.

14 Claims, 11 Drawing Sheets

FIG.1
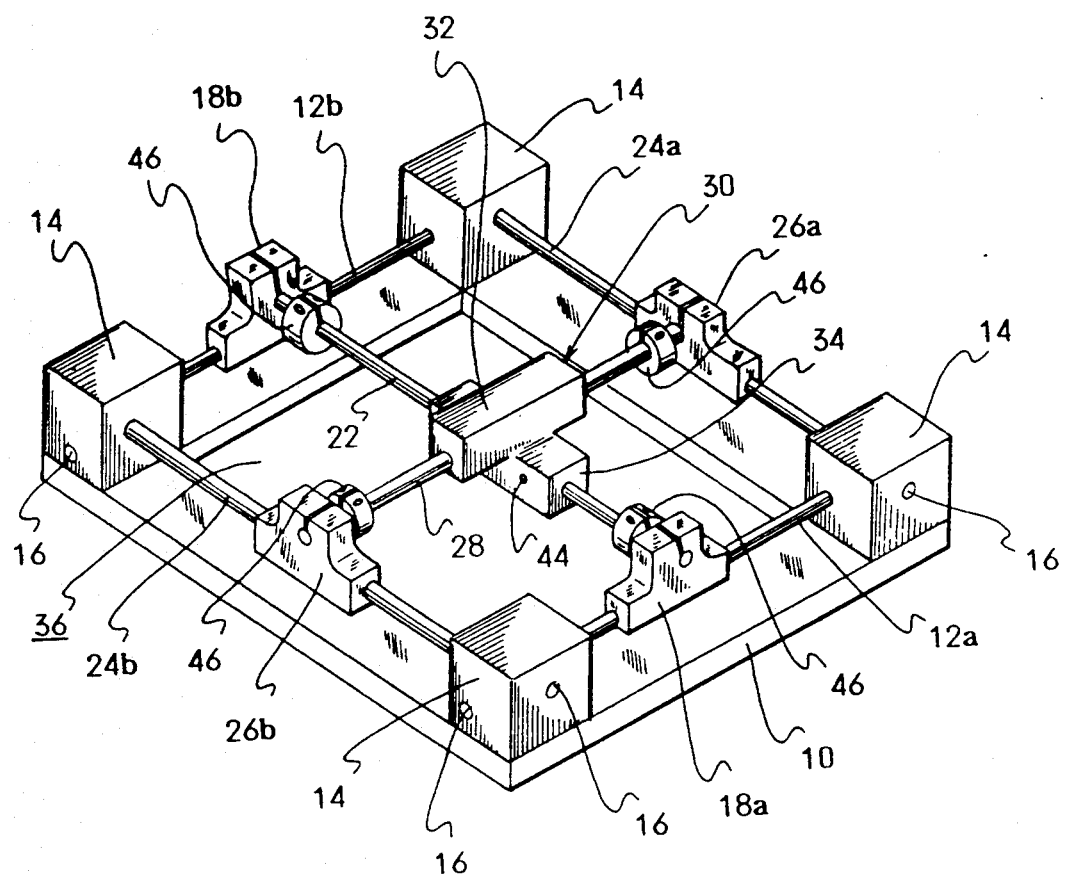
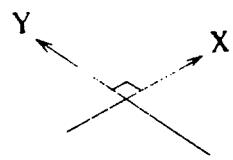

FIG. 10
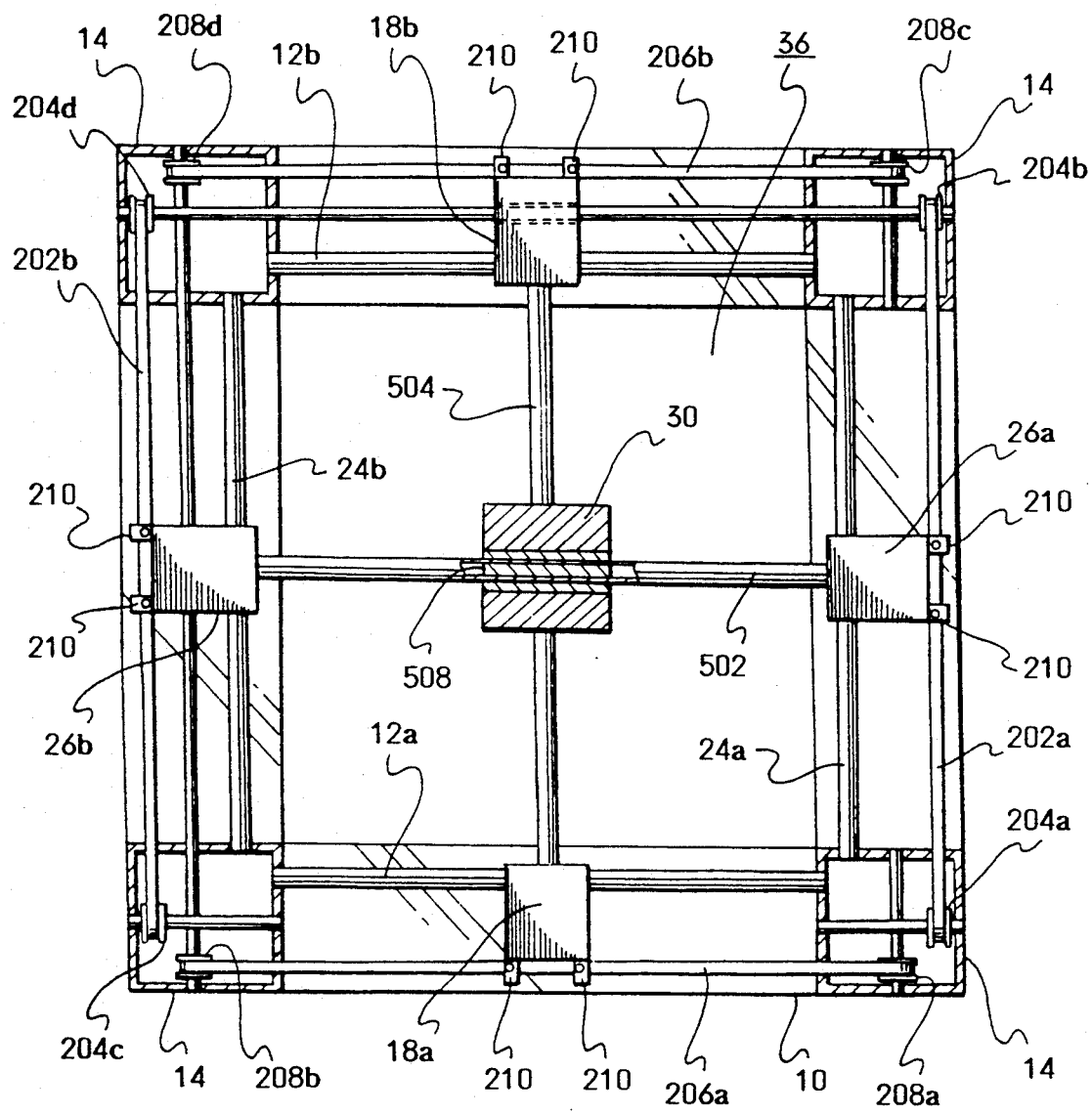
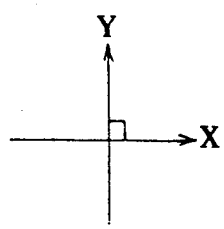

TWO DIMENSIONAL DRIVE SYSTEM

BACKGROUND OF THE INVENTION

The present invention relates to a two dimensional drive system, and more precisely relates to a two drive system whose moving body is driven in a plane by fluid pressure.

Conventionally, there have been several drive systems which are driven by fluid pressure. Hydraulic cylinder units, air cylinder units, rodless cylinder units, etc. have been known as pressure driven drive systems. In the conventional drive systems, moving bodies, which are attached to cylinder rods or to driven parts, are linearly driven by selectively supplying fluid, e.g. oil, air, to chambers in units.

However, the conventional drive systems have a disadvantage. Namely, their moving bodies are allowed linear movement only. They cannot be allowed two dimensional movement.

SUMMARY OF THE INVENTION

An object of the present invention is to provide a two dimensional drive system, which is capable of two dimensional movement.

To achieve the object, the two dimensional drive system of the present invention has three basic structures.

Firstly, the first basic structure comprises:

a pair of X-guides being arranged parallel in an X-direction;

a pair of Y-guides being arranged parallel in a Y-direction perpendicular to the X-direction;

an X-rod being arranged parallel to the X-guides, each end of the X-rod is slidably attached to each Y-guide;

a Y-rod being arranged parallel to the Y-guides, each end of the Y-rod is slidably attached to each X-guide;

an X-piston section being provided at the midway of the X-rod, the diameter of the X-piston section is greater than that of the X-rod;

a Y-piston section being provided at the midway of the Y-rod, the diameter of the Y-piston section is greater than that of the Y-rod; and a moving body having an X-chamber in the X-direction through which the X-rod is pierced, and a Y-chamber in the Y-direction through which the Y-rod is pierced, whereby the moving body is capable of moving on the X- and Y-rods, the X-chamber being divided into two subchambers by the X-piston section, the Y-chamber being divided into two subchambers by the Y-piston section, wherein the moving body is capable of moving in a plane by selectively supplying fluid to each subchamber.

Secondly, the second basic structure comprises:

a pair of X-guides being arranged parallel in an X-direction;

a pair of Y-guides being arranged parallel in a Y-direction perpendicular to the X-direction;

a first X-rod being arranged parallel to the X-guides, each end of the first X-rod is slidably attached to each Y-guides;

a first Y-rod being arranged parallel to the Y-guides, each end of the first Y-rod is slidably attached to each X-guides;

a first X-piston section being provided at the midway of the first X-rod, the diameter of the first X-piston section is greater than that of the first X-rod;

a first Y-piston section being provided at the midway of the first Y-rod, the diameter of the first Y-piston section is greater than that of the first Y-rod;

an X-cylinder section having a first X-chamber in the X-direction through which the first X-rod is pierced whereby the X-cylinder section is capable of moving on the first X-rod, the first X-chamber being divided into two first X-subchambers by the first X-piston section;

a Y-cylinder section having a first Y-chamber in the Y-direction through which the first Y-rod is pierced whereby the Y-cylinder section is capable of moving on the first Y-rod, the first Y-chamber being divided into two first Y-subchambers by the first Y-piston section;

a second X-rod being provided on the X-cylinder section and arranged in the X-direction;

a second Y-rod being provided on the Y-cylinder section and arranged in the Y-direction;

a second X-piston section being provided at the midway of the second X-rod, the diameter of the second X-piston section is greater than that of the second X-rod;

a second Y-piston section being provided at the midway of the second Y-rod, the diameter of the second Y-piston section is greater than that of the second Y-rod; and a moving body having a second X-chamber in the X-direction through which the second X-rod is pierced, and a second Y-chamber in the Y-direction through which the second Y-rod is pierced, whereby the moving body is capable of moving on the second X- and Y-rods, the second X-chamber being divided into two second X-subchambers by the second X-piston section, the second Y-chamber being divided into two Y-subchambers by the second Y-piston section, wherein the moving body is capable of moving in a plane by selectively supplying fluid to the first X-subchambers, the second X-subchambers, the first Y-subchambers and the second Y-subchambers.

Thirdly, the third basic structure comprises:

a pair of X-guides being arranged parallel in an X-direction;

a pair of Y-guides being arranged parallel in a Y-direction perpendicular to the X-direction;

an X-rod having an X-chamber in the X-direction, the X-rod being arranged parallel to the X-guides, each end of the X-rod is slidably attached to each X-guide;

a Y-rod having a Y-chamber in the Y-direction, the Y-rod being arranged parallel to the X-guides, each end of the Y-rod is slidably attached to each X-guide;

an X-piston being movably provided in the X-chamber, the X-piston dividing the X-chamber into two subchambers;

a Y-piston being movably provided in the Y-chamber, the Y-piston dividing the Y-chamber into two subchambers; and a moving body being pierced by the X- and Y-rods so as to move thereon, the moving body is connected to the X- and Y-pistons so as to move on the X- and Y-rods together therewith, wherein the moving body is capable of moving in a plane by selectively supplying fluid to each subchamber.

In the two dimensional drive system of the present invention, by selectively supplying fluid to the subchambers, the moving body can be executed two dimensional movement in a plane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings, which are given by way of illustration only, and thus are not limitative of the present invention, and in which:

FIG. 1 is a perspective view of a drive system of a First Embodiment;

FIG. 10 is a plan view of a Seventh Embodiment;

DETAILED DESCRIPTION OF THE PREFERRED EMBODIMENTS

Preferred embodiments of the present invention will now be described in detail with reference to the accompanying drawings.

First Embodiment

Figure 2:
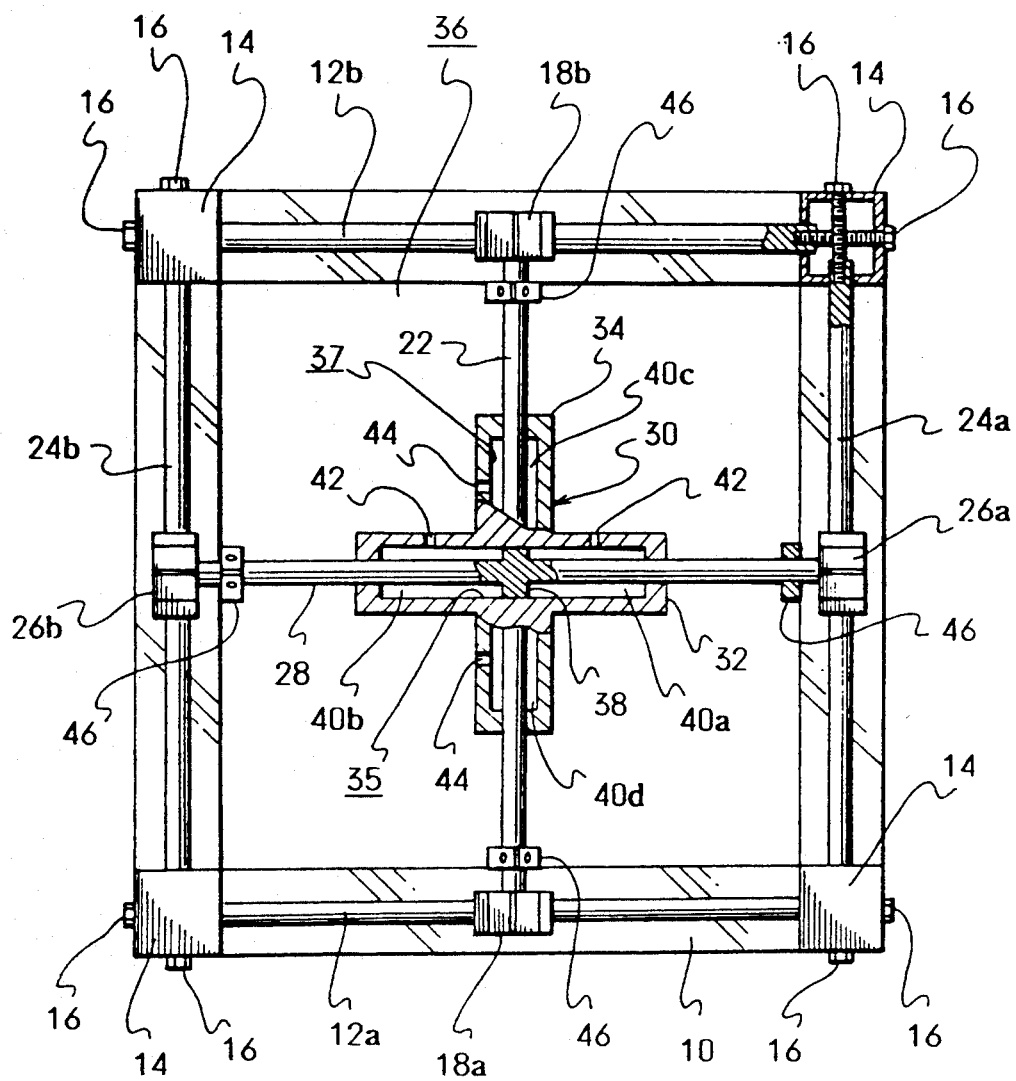
FIG. 2 is a plan view of the First, Embodiment.

An First Embodiment will be explained with reference to FIGS. 1 and 2.

A base 10 is formed like a frame.

X-guides 12a and 12b are made of metal shafts. The X-guides 12a and 12b are provided above the base 10 and arranged in the X-direction. Ends of the X-guides 12a and 12b are fixed to boxes 14, which are provided at corners of the base 10, by bolts 16.

X-travellers 18a and 18b are slidably attached to the X-guides 12a and 12b. The X-travellers 18a and 18b include slide bearings (not shown) so as to prevent abrasion between the X-travellers 18a and 18b and the X-guides 12a and 12b.

A Y-rod 22 is a metal shaft. The ends of the Y-rod 22 are respectively fixed at the X-travellers 18a and 18b. Therefore, the X-travellers 18a and 18b can be moved together in the X-direction.

Y-guides 24a and 24b are made of metal shafts. The Y-guides 24a and 24b are provided above the base 10 and arranged in the Y-direction perpendicular to the X-direction. Ends of the Y-guides 24a and 24b are also fixed to the boxes 14 by bolts 16.

Y-travellers 26a and 26b are slidably attached to the Y-guides 24a and 24b. The Y-travellers 26a and 26b also include slide bearings (not shown) so as to prevent abrasion between the Y-travellers 26a and 26b and the Y-guides 24a and 24b.

A X-rod 28 is a metal shaft. The ends of the X-rod 28 are respectively fixed at the Y-travellers 26a and 26b. Therefore, the Y-travellers 26a and 26b can be moved together in the Y-direction.

A slider 30, which is an example of moving bodies, is a cross-shaped block. The slider 30 has an upper section 32 and a lower section 34. There is formed an X-chamber 35, which is bored in the X-direction, in the upper section 32; there is formed a Y-chamber 37, which is bored in the Y-direction, in the lower section 34. The X-rod 28 is pierced through the X-chamber 35; the Y-rod 22 is pierced through the Y-chamber 37, so that the X-rod 28 and the Y-rod 22 are crossed in the slider 30. By this structure, the slider 30 can be moved on the X-rod 28 and the Y-rod 22 and can execute two dimensional movement in a plane 36, which is rounded by the X-guides 12a and 12b and the Y-guides 24a and 24b. Robot heads, tools, work, etc. can be attached to the slider 30.

In the upper section 32 of the slider 30, there is provided an X-piston section 38 at the center of the X-rod 28. The diameter of the X-piston section 38 is greater than that of the X-rod 28. The X-piston section 38 divides the X-chamber 35 into subchambers 40a and 40b. Compressed air, which is an example of fluid, is selectively supplied to the subchambers 40a and 40b from a compressor (not shown) via ports 42. By selectively supplying compressed air to the subchambers 40a and 40b, the slider 30 selectively moves on the X-rod 28 in the X-direction, so that the Y-rod 22 and the X-travellers 18a and 18b move together in the X-direction. Note that, the moving stroke of the slider 30 in the X-direction may be defined by the length of the subchambers 40a and 40b.

The structure of the lower section 34 of the slider 30 is the same as the upper section 32 thereof. Namely, there is provided a Y-piston section, which corresponds to the X-piston section 38, at the center of the Y-rod 22. The diameter of the Y-piston section is greater than that of the Y-rod 22. The Y-piston section divides the Y-chamber 37 into subchambers 40c and 40d. Compressed air is selectively supplied to the subchambers 40c and 40d from the compressor via ports 44. By selectively supplying compressed air to the subchambers 40c and 40d, the slider 30 selectively moves on the Y-rod 22 in the Y-direction, so that the X-rod 28 and the Y-travellers 26a and 26b move together in the Y-direction. Note that, the moving stroke of the slider 30 in the Y-direction may be defined by the length of the subchambers 40c and 40d. By combining the X- and Y-directional movement, the slider 30 can execute two dimensional movement in the plane 36.

Stoppers 46 are detachably fixed on the X-rod 28 and the Y-rod 22 so as to limit the movement of the slider 30. To adjust the stroke of the slider 30, the stoppers 46 can be slid on the X-rod 28 and the Y-rod 22.

Second Embodiment

Figure 3:
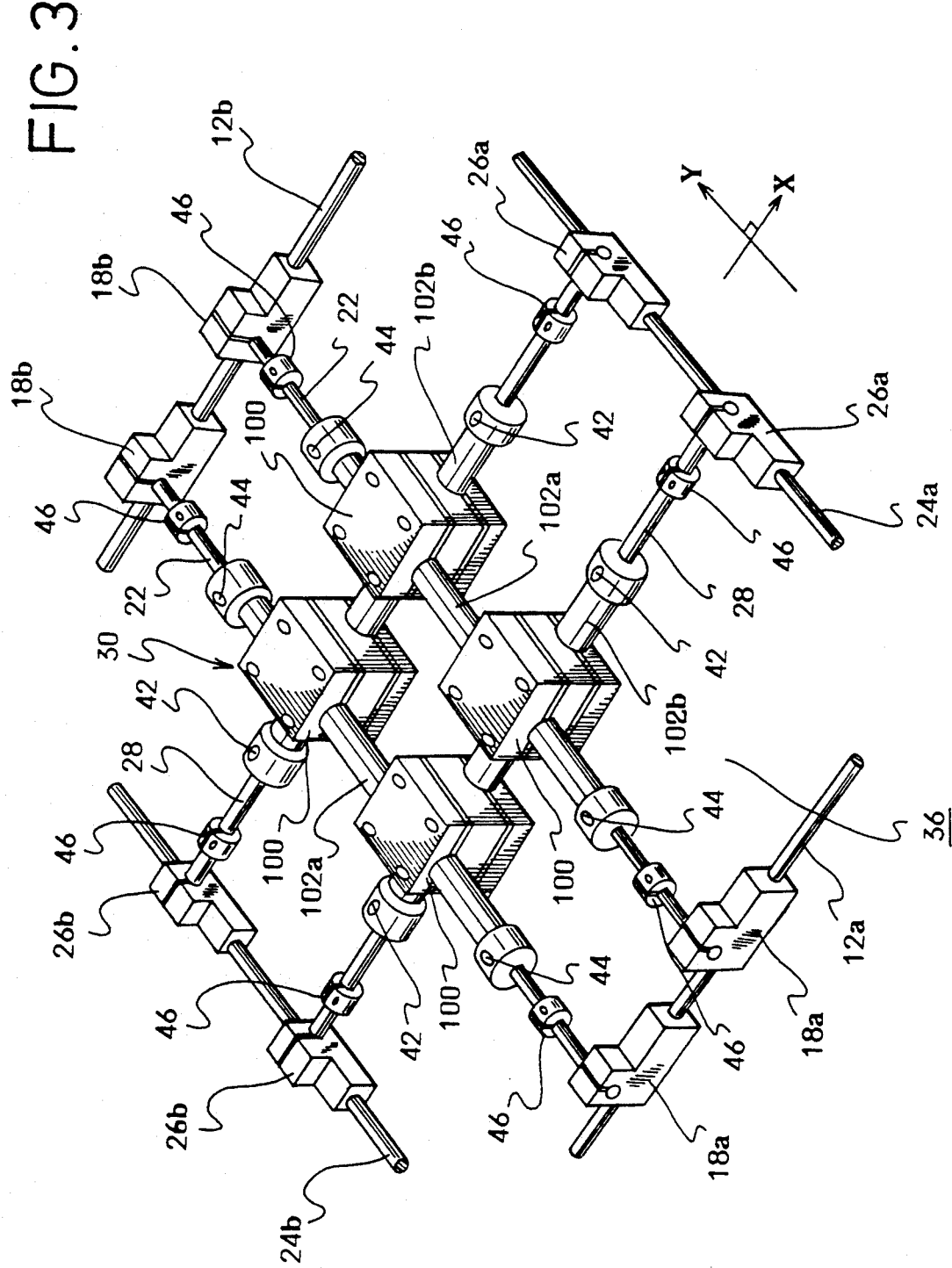
FIG. 3 is a partially perspective view of a Second Embodiment.

A Second Embodiment will be explained with reference to FIG. 3. Note that, the Second Embodiment is a modified embodiment of the First Embodiment, so components, which are the same as ones in the First Embodiment, are assigned the same symbols, and the explanation thereof will be omitted.

A slider 30 has four block sections 100, two cylinder sections 102a in which Y-chambers are formed, and two cylinder sections 102b in which X-chambers are formed.

Y-rods 22 are respectively pierced through the cylinder sections 102a; X-rods 28 are respectively pierced through the cylinder sections 102b. With this structure, the blocks 100 and the cylinder sections 102a and 102b can be moved together as a single slider 30. Note that, the Y-chambers formed in the cylinder sections 102a are, as well as the First Embodiment, respectively divided into two subchambers by Y-piston sections (not shown), which are respectively provided at the center of each Y-rod 22; the X-chambers formed in the cylinder sections 102b are, as well as the First Embodiment, also respectively divided into two subchambers by X-piston sections(not shown), which are respectively provided at the center of each X-rod 28.

In the present embodiment, thrust force applying to the slider 30 is twice as great as that of the First Embodiment. With greater thrust force, even if a plane 36 is inclined or vertical, the slider 30 can be driven easily.

Third Embodiment

Figure 4:
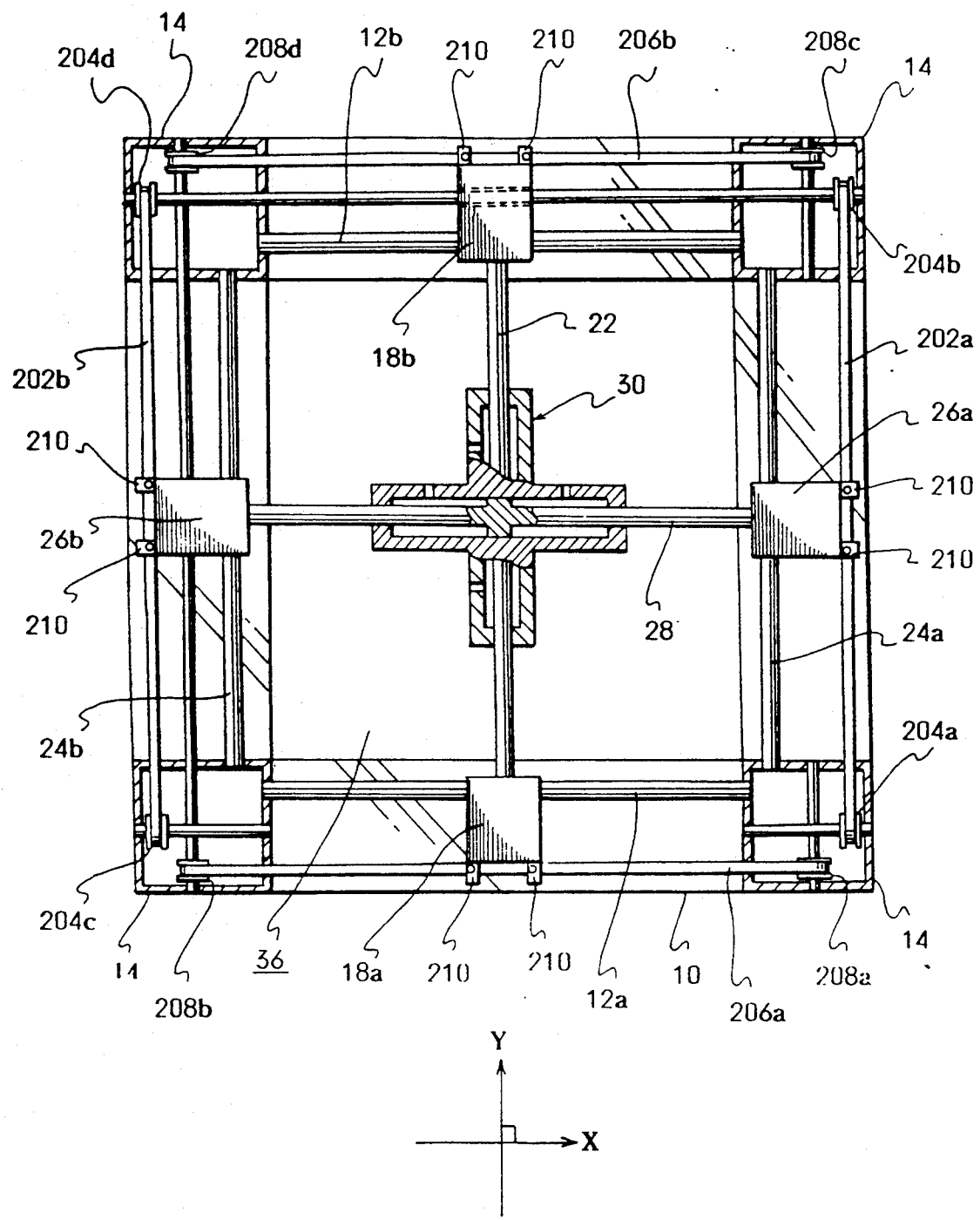
FIG. 4 is a plan view of a Third Embodiment.

A Third Embodiment will be explained with reference to FIG. 4. Note that, the Third Embodiment is also a modified embodiment of the First Embodiment, so components, which are the same as ones in the First Embodiment, are assigned the same symbols, and the explanation thereof will be omitted.

First timing belts 202a and 202b, which constitute X-restraining means, are arranged parallel to Y-guides 24a and 24b. The first timing belt 202a engages with first timing pulleys 204a and 204b; the first timing belt 202b engages with first timing pulleys 204c and 204d. The timing pulleys 204a, 204b, 204c and 204d constitute the X-restraining means with the first timing belts 202a and 202b. The timing pulleys 204a, 204b, 204c and 204d are accommodated in boxes 14.

Second timing belts 206a and 206b, which constitute Y-restraining means, are arranged parallel to X-guides 12a and 12b. The second timing belt 206a engages with second timing pulleys 208a and 208b; the second timing belt 206b engages with second timing pulleys 208c and 208d. The timing pulleys 208a, 208b, 208c and 208d constitute the Y-restraining means with the second timing belts 206a and 206b. The timing pulleys 208a, 208b, 208c and 208d are accommodated in boxes 14.

X-travellers 18a and 18b are respectively connected to the second timing belts 206a and 206b by connecting members 210. With this structure, the second timing belts 206a and 206b are driven by the movement of the X-travellers 18a and 18b.

Y-travellers 26a and 26b are respectively connected to the first timing belts 202a and 202b by connecting members 210. With this structure, the first timing belts 202a and 202b are driven by the movement of the Y-travellers 26a and 26b.

By providing the X-restraining means, the inclination of the X-rod 28 with respect to the X-axis can be prevented; by providing the Y-restraining means, the inclination of the Y-rod 22 with respect to the Y-axis can be prevented. Therefore, positioning accuracy of a slider 30 can be higher. Additionally, vibration and noise during high speed operation can be prevented.

Fourth Embodiment

Figure 5:
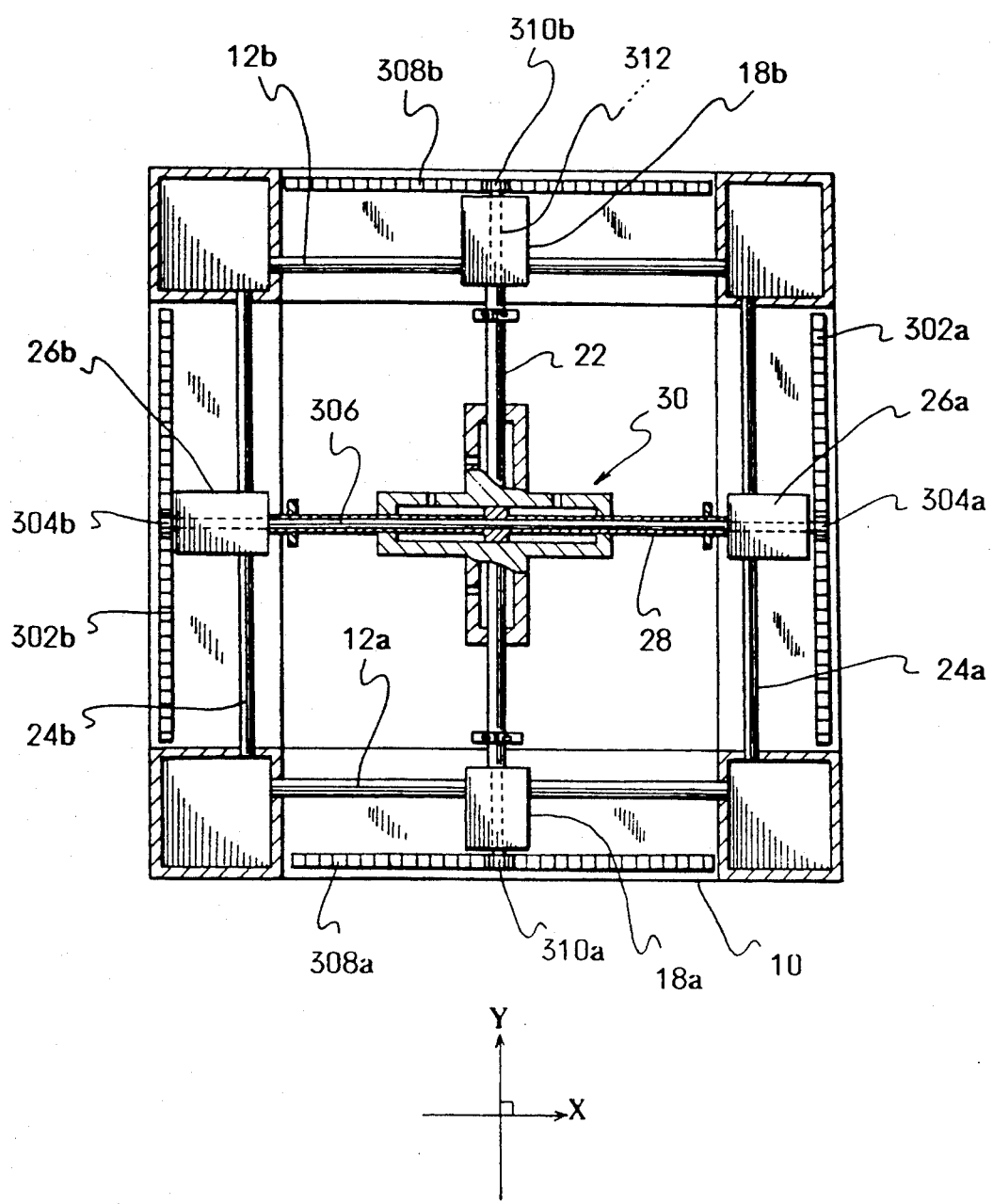
FIG. 5 is a plan view of a Fourth Embodiment.

A Fourth Embodiment will be explained with reference to FIG. 5. Note that, the Fourth Embodiment is also a modified embodiment of the First Embodiment, so components, which are the same as ones in the First Embodiment, are assigned the same symbols, and the explanation thereof will be omitted.

First racks 302a and 302b, which constitute X-restraining means, are arranged parallel to Y-guides 24a and 24b.

First pinions 304a and 304b, which constitute X-restraining means, are respectively engaged with the first racks 302a and 302b. The first pinions 304a and 304b are capable of rotating on the first racks 302a and 302b.

A first shaft 306, which constitutes X-restraining means, is arranged in the X-direction, and rotatably pierced through a hollow cylindrical X-rod 28, a slider 30 and Y-travellers 26a and 26b. The first pinions 304a and 304b are respectively fixed at each end of the first shaft 306.

Second racks 308a and 308b, which constitute Y-restraining means, are arranged parallel to X-guides 12a and 12b.

Second pinions 310a and 310b, which constitute Y-restraining means, are respectively engaged with the second racks 308a and 308b. The second pinions 310a and 310b are capable of rotating on the second racks 308a and 308b.

A second shaft 312, which constitutes Y-restraining means, is arranged in the Y-direction, and rotatably pierced through a hollow cylindrical Y-rod 22, the slider 30 and X-travellers 18a and 18b. The second pinions 310a and 310b are respectively fixed at each end of the second shaft 312.

By the movement of the X-travellers 18a and 18b, the second pinions 310a and 310b rotate on and along the second racks 308a and 308b. While, by the movement of the Y-travellers 26a and 26b, the first pinions 304a and 304b rotate on and along the first racks 302a and 302b.

By providing the X-restraining means, the inclination of the X-rod 28 with respect to the X-axis can be prevented; by providing the Y-restraining means, the inclination of the Y-rod 22 with respect to the Y-axis can be prevented. Therefore, positioning accuracy of the slider 30 can be higher. Additionally, vibration and noise during high speed operation can be prevented.

Note that, the X-rod 28 and the Y-rod 22 are filled with lubricant, e.g. grease, so that abrasion and noise, which are caused between the inner faces of the rods 22 and 28 and the outer circumferential faces of the shafts 306 and 312.

Fifth Embodiment

Figure 6:
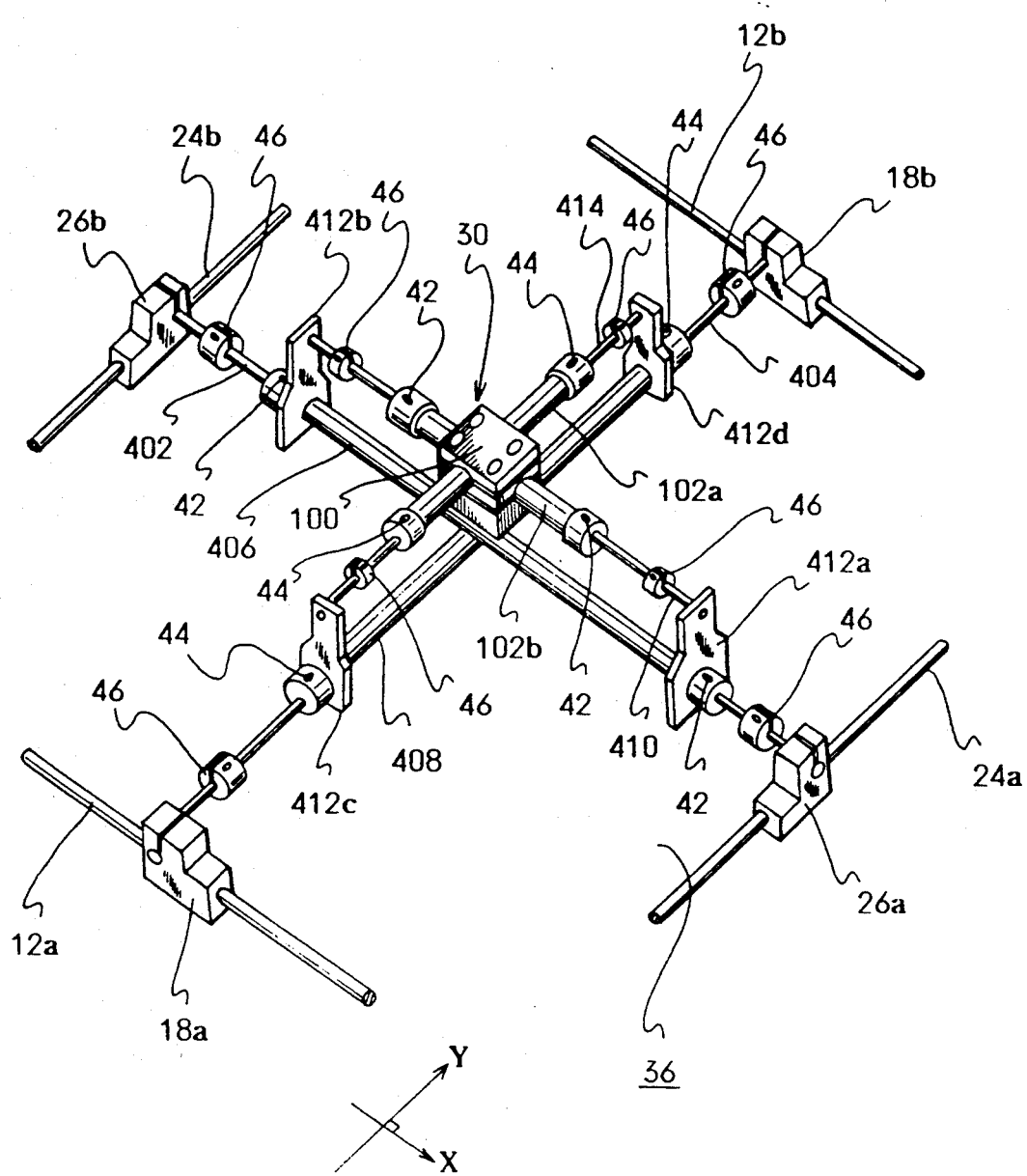
FIG. 6 is a partially perspective view of a Fifth Embodiment.
Figure 7:
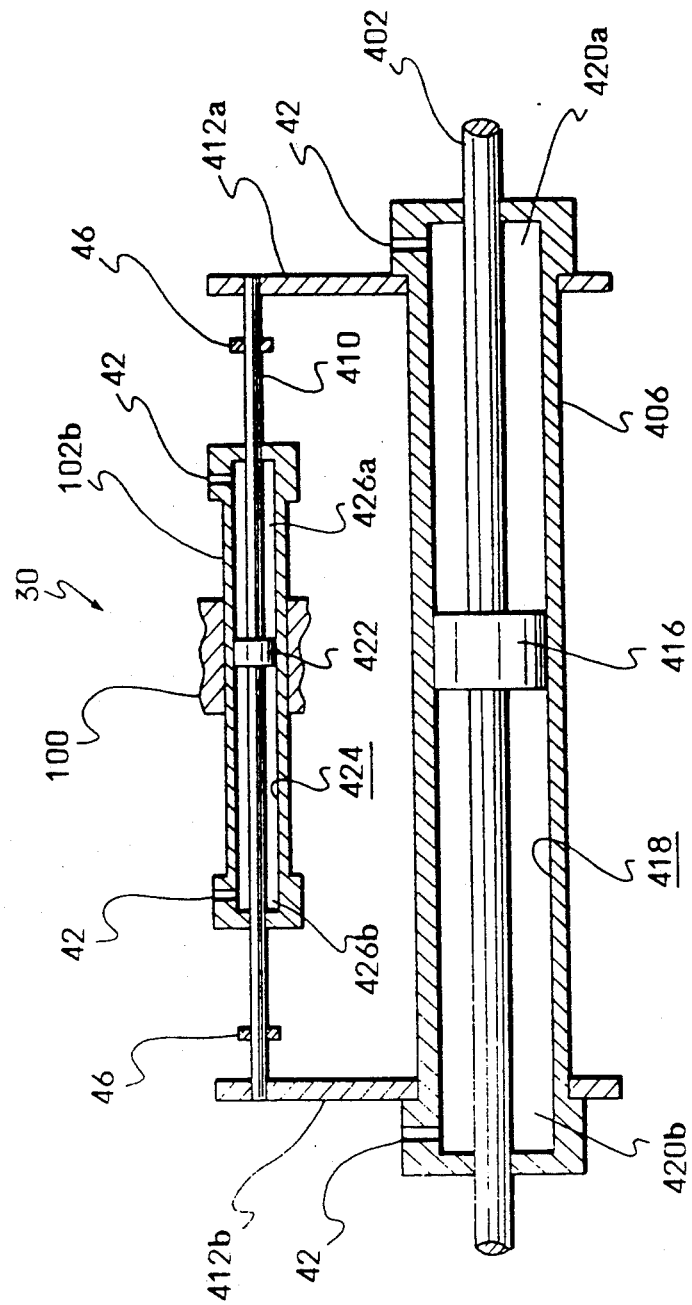
FIG. 7 is partially sectional view of the Fifth Embodiment.

A Fifth Embodiment will be explained with reference to FIGS. 6 and 7. Note that, components, which are the same as ones in the prior embodiments, are assigned same symbols, and the explanation thereof will be omitted.

Each end of a first X-rod 402 is Y-travellers 26a and 26b. There is provided a first X-piston section 416, whose diameter is greater than that of the first X-rod 402, at the midway thereof.

Each end of a first Y-rod 404 is X-travellers 18a and 18b. Similarly to the first X-piston section 416, there is provided a first Y-piston section, whose diameter is greater than that of the first Y-rod 404, at the midway thereof.

In an X-cylinder section 406, a first X-chamber 418 is formed in the X-direction. The first X-rod 402 is pierced through the first X-chamber 418, so that the X-cylinder section 406 is capable of moving on and along the first X-rod 402. The first X-chamber 418 is divided into two first X-subchambers 420a and 420b by the first X-piston section 416. By selectively supplying compressed air to the first X-subchambers 420a and 420b, a slider 30 is capable of moving on and along the first X-rod 402 in the X-direction together with the X-cylinder section 406.

In a Y-cylinder section 408, a first Y-chamber 418, as well as the X-cylinder section 406, is formed in the Y-direction. The first Y-rod 404 is pierced through the first Y-chamber, so that the Y-cylinder section 408 is capable of moving on and along the first Y-rod 404. The first Y-chamber is also divided into two first Y-subchambers by the first Y-piston section. By selectively supplying compressed air to the first Y-subchambers, the slider 30 is capable of moving on and along the first Y-rod 404 in the Y-direction together with the Y-cylinder section 408.

A second X-rod 410 is arranged in the X-direction. Both ends of the second X-rod 410 are respectively fixed at supporting pieces 412a and 412b, which are provided on the X-cylinder section 406. There is provided a second X-piston section 422, whose diameter is greater than that of the second X-rod 410, at the midway of the second X-rod 410.

A second Y-rod 414 is arranged in the Y-direction. Both ends of the second Y-rod 414 are respectively fixed at supporting pieces 412c and 412d, which are provided on the Y-cylinder section 408. Similarly to the second X-rod 410, there is provided a second Y-piston section, whose diameter is greater than that of the second Y-rod 414, at the midway of the second Y-rod 414.

The slider 30 has a block section 100 and cylinder sections 102a and 102b. In the cylinder section 102b, a second X-chamber 424 is formed in the X-direction. The second X-rod 410 is pierced through the second X-chamber 424. With this structure, the slider 40 is capable of moving on the second X-rod 410 and the second Y-rod 414. In the cylinder section 102b, as well as the cylinder section 102a, a second Y-chamber is formed in the Y-direction. The second Y-rod 414 is pierced through the second Y-chamber.

The second X-chamber 424 in the cylinder section 102b is divided into two second X-subchambers 426a and 426b by the second X-piston section 422; the second Y-chamber in the cylinder section 102a is, as well as the second X-chamber 424, divided into two second Y-subchambers by the second Y-piston section. By supplying compressed air to the second X-subchambers 426a and 426b and the second Y-subchambers, the slider 30 is capable of moving in the X- and the Y-directions on the second X-rod 410 and the second Y-rod 414.

By supplying compressed air to the first X-subchambers 420a and 420b, the first Y-subchambers, the second X-subchambers 426a and 426b and the second Y-subchambers, the slider 30 is capable of two dimensional movement in a rectangle plane 36. In comparison with foregoing embodiments, positioning points of the slider 30 can be increased. Namely, the slider 30 can be located at four points in the X- and the Y-directions, so that 16 positioning points can be defined in the plane 36. In each foregoing embodiment, positioning point is four, so the present embodiment has four times as many positioning points as they have.

Sixth Embodiment

Figure 8:
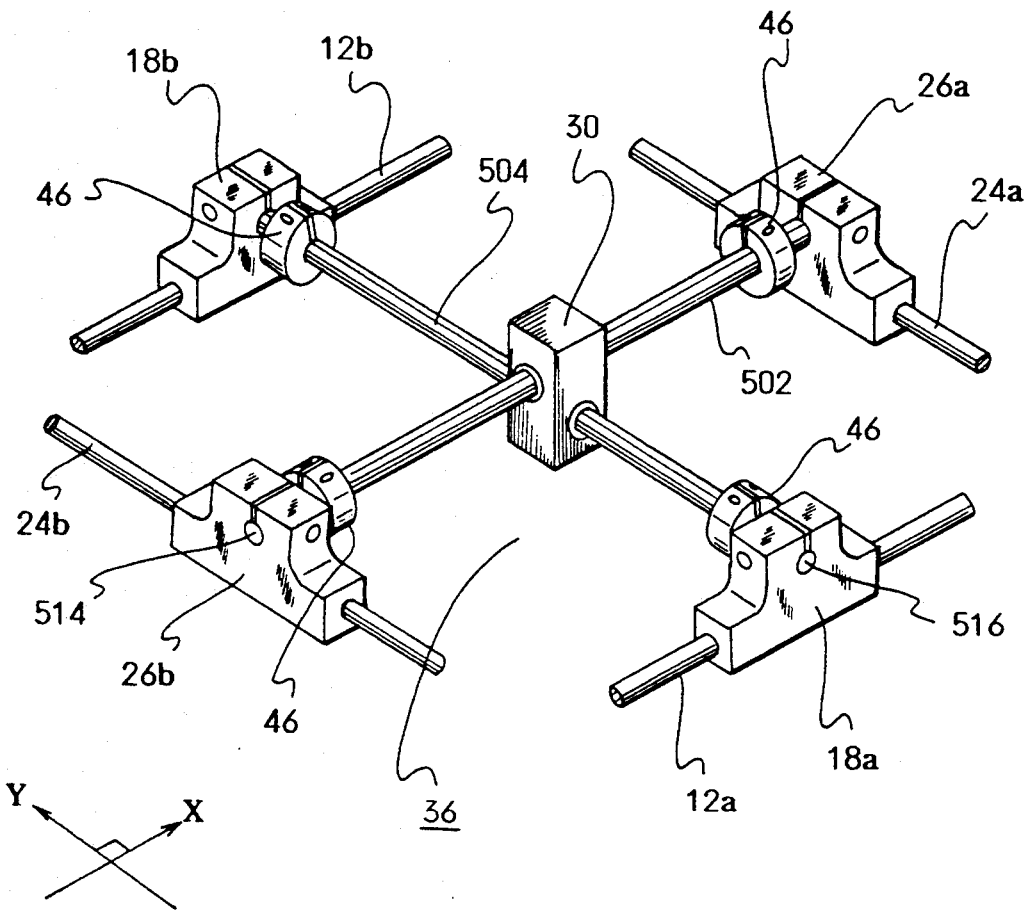
FIG. 8 is a partially perspective view of a Sixth Embodiment.
Figure 9:
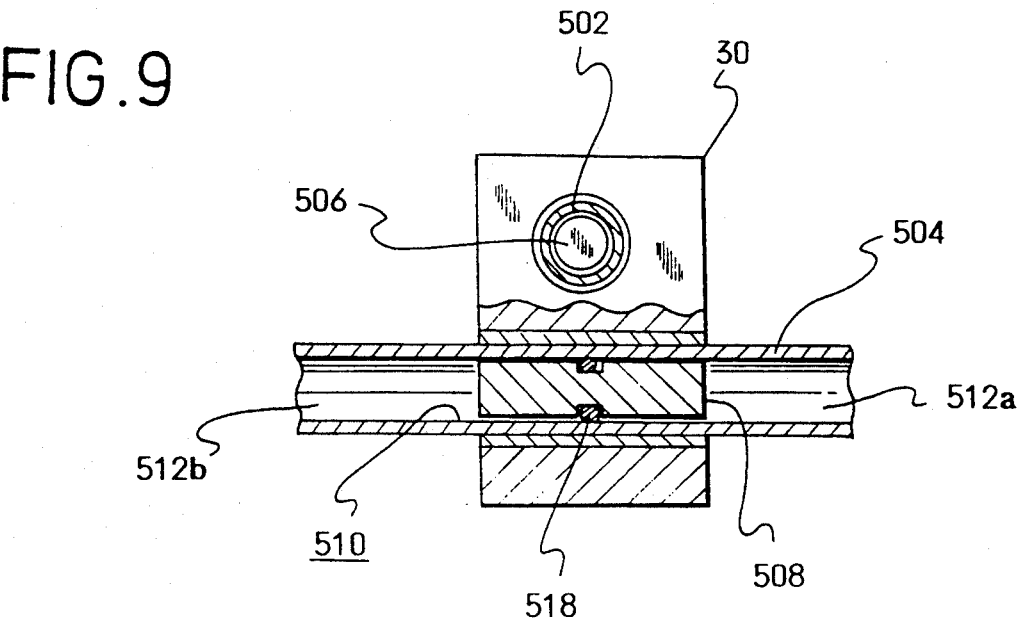
FIG. 9 is a partially sectional view of the Sixth Embodiment.

A Sixth Embodiment will be explained with reference to FIGS. 8 and 9. Note that, components, which are the same as ones in the prior embodiments, are assigned the same symbols, and the explanation thereof will be omitted.

An X-rod 502 and a Y-rod 504, which are pierced through a slider 30, are formed like hollow cylinders.

There are respectively provided an X-piston 506 and a Y-piston 508 in the X- and the Y-rods 502 and 504. The pistons 506 and 508 are made of magnet and capable of moving in the X- and the Y-directions.

The Y-rod 504 has a Y-chamber 510. The Y-chamber 510 is divided into two subchambers 512a and 512b by the Y-piston 508. Compressed air may be supplied to the subchambers 512a and 512b via air-ports 514, which are respectively provided in Y-travellers 26a and 26b. By selectively supplying compressed air to the subchambers 512a and 512b, the Y-piston 508 can be selectively moved in the Y-direction. Note that, symbols 518 show seal rings. The X-rod 502 has the same structure, so that the X-piston 506 can be selectively moved in the X-direction by selectively supplying compressed air to two subchambers, which are in the X-rod 502 and divided by the X-piston 506, via air-ports 516, which are respectively provided in X-travellers 18a and 18b. Note that, the length of the stroke of the piston 506 and 508 may be defined by the length of the X- and the Y-rods 502 and 504.

The slider 30 is made of one of magnetizable materials, so that the slider 30 is magnetically connected to the pistons 506 and 508. The slider 30 is capable of moving in the X- and Y-directions together with the pistons 506 and 508. With this structure, the slider 30 is moved in the X- and Y-directions in a plane 36 by selectively supplying compressed air to the subchambers. In the present embodiment, the pistons 506 and 508 are made of magnet, and the slider 30 is made of magnetizable materials but the present invention is not limited to above described structure. For example, the pistons 506 and 508 may be made of magnetizable materials, and the slider 30 may be made of magnet. Furthermore, the pistons 506 and 508 and the slider 30 are connected not only by magnetic force but mechanical couplers.

Seventh Embodiment

A Seventh Embodiment will be explained with reference to FIG. 10. Note that, the Seventh Embodiment is a modified embodiment of the sixth Embodiment, so components, which are the same as ones in the prior embodiments, are assigned the same symbols, and the explanation thereof will be omitted.

In the present embodiment, the drive system, whose basic structure is the same as the drive system of the Sixth Embodiment, has X-restraining means and Y-restraining means.

The X-restraining means has first timing belts 202a and 202b and first timing pulleys 204a, 204b, 204c and 204d; the Y-restraining means has second timing belts 206a and 206b and first timing pulleys 208a, 208b, 208c and 208d.

Also in the present embodiment, the inclination of an X-rod 502 with respect to the X-axis can be prevented by the X-restraining means; the inclination of a Y-rod 504 with respect to the Y-axis can be prevented by the Y-restraining means. Therefore, positioning accuracy of a slider 30 can be higher. Additionally, vibration and noise during high speed operation can be prevented.

Eigth Embodiment

Figure 11:
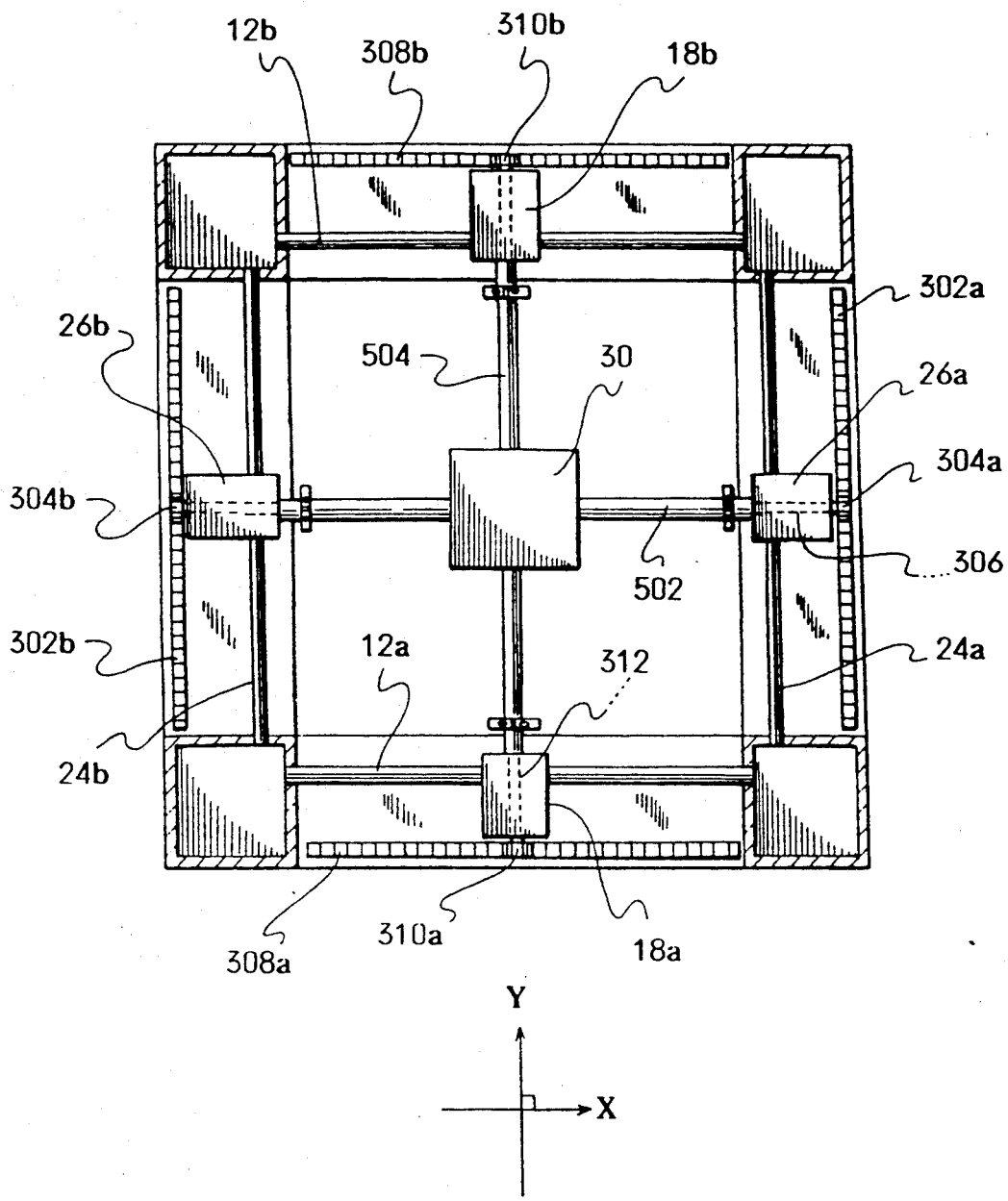
FIG. 11 is a plan view of a Eighth Embodiment.
Figure 12:
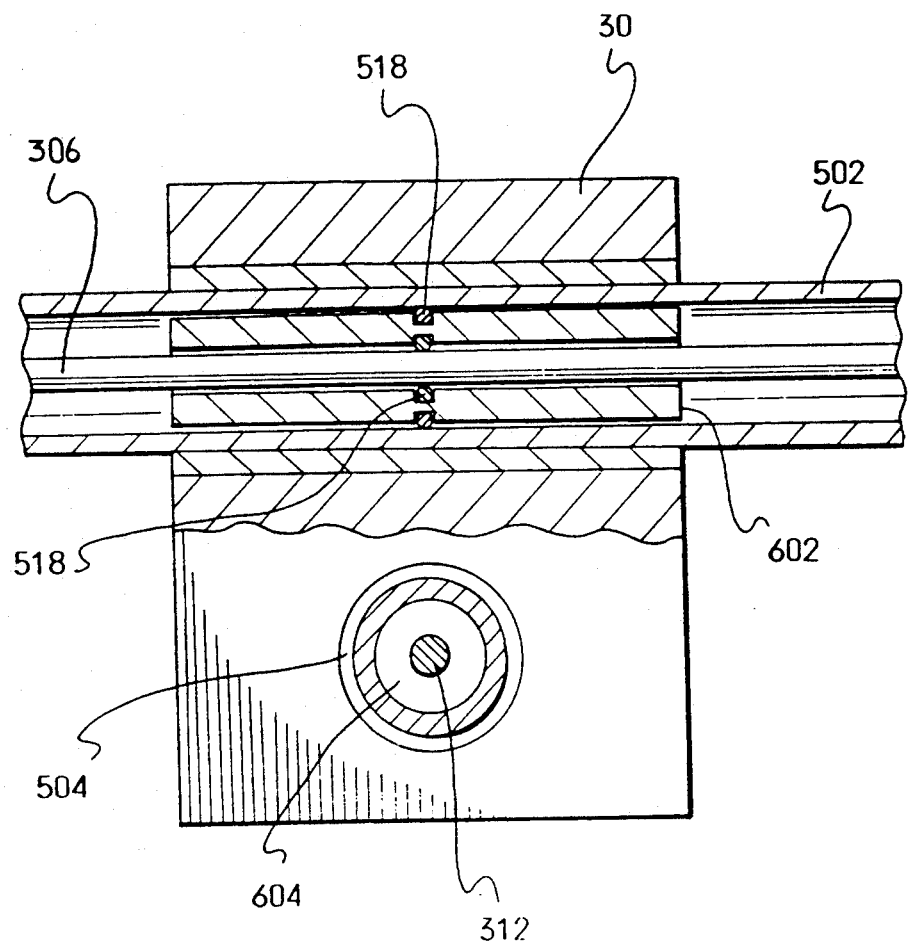
FIG. 12 is a partially sectional view of the Eighth Embodiment.

A Eighth Embodiment will be explained with reference to FIGS. 11 and 12. Note that, the Eighth Embodiment is also a modified embodiment of the sixth Embodiment, so components, which are the same as ones in the prior embodiments, are assigned the same symbols, and the explanation thereof will be omitted.

In the present embodiment, the drive system, whose basic structure is the same as the drive system of the Sixth Embodiment, has X-restraining means and Y-restraining means.

The X-restraining means has first racks 302a and 302b, first pinions 304a and 304b and a first shaft 306. Note that, a X-piston 602 has a hollow cylindrical shape, and a first shaft 306 is pierced therethrough.

The Y-restraining means has second racks 308a and 306b, second pinions 310a and 310b and a second shaft 312. Note that, a Y-piston 604 has a hollow cylindrical shape, and a second shaft 312 is pierced therethrough.

Also in the present embodiment, the inclination of an X-rod 502 with respect to the X-axis can be prevented by the X-restraining means; the inclination of a Y-rod 504 with respect to the Y-axis can be prevented by the Y-restraining means. Therefore, positioning accuracy of a slider 30 can be higher. Additionally, vibration and noise during high speed operation can be prevented.

Preferred embodiments of the present inventions have been described above but the present invention is not limited to the embodiments, for example, oil pressure can be applied to the drive system instead of air pressure. It should be appreciated that the present invention can modified without deviating the scope of the claims.

What is claimed is:

1. A two dimensional drive system, comprising:
   a pair of X-guides being arranged parallel in an X-direction;
   a pair of Y-guides being arranged parallel in a Y-direction perpendicular to the X-direction;
   an X-rod being arranged parallel to said X-guides, each end of said X-rod is slidably attached to each Y-guide;
   a Y-rod being arranged parallel to said Y-guides, each end of said Y-rod is slidably attached to each X-guide;
   an X-piston section being provided at the midway of said X-rod, the diameter of said X-piston section is greater than that of said X-rod;
   a Y-piston section being provided at the midway of said Y-rod, the diameter of said Y-piston section is greater than that of said Y-rod; and
   a moving body having an X-chamber in the X-direction through which said X-rod is pierced, and a Y-chamber in the Y-direction through which said Y-rod is pierced, whereby said moving body is capable of moving on said X- and Y-rods, said X-chamber being divided into two subchambers by said X-piston section, said Y-chamber being divided into two subchambers by said Y-piston section,
   wherein said moving body is capable of moving in a plane by selectively supplying fluid to each subchamber.

2. The two dimensional drive system according to claim 1, further comprising:
   X-restraining means for restraining the inclination of said X-rod with respect to the X-direction; and
   Y-restraining means for restraining the inclination of said Y-rod with respect to the Y-direction.

3. The two dimensional drive system according to claim 2, wherein,
   said X-restraining means comprising:
      a pair of first timing belts being arranged parallel to said Y-guides; and
      two pairs of first timing pulleys being engaged with each first timing belt, and
   said Y-restraining means comprising:
      a pair of second timing belts being arranged parallel to said X-guides; and
      two pairs of second timing pulleys being engaged with each second timing belt.

4. The two dimensional drive system according to claim 2, wherein,
   said X-restraining means comprising:
      a pair of first racks being arranged parallel to said Y-guides;
      a first shaft being arranged in the X-direction and pierced through said moving body, said first shaft being capable of turning on the axis thereof; and
      a pair of first pinions being respectively fixed at each end of said first shaft, said first pinions being respectively engaged with each first rack, and
   said Y-restraining means comprising:
      a pair of second racks being arranged parallel to said X-guides;
      a second shaft being arranged in the Y-direction and pierced through said moving body, said second shaft being capable of turning on the axis thereof; and
      a pair of second pinions being respectively fixed at each end of said second shaft, said second pinions being respectively engaged with each second rack.

5. The two dimensional drive system according to claim 4, wherein,
   said X-rod is a hollow pipe and said first shaft is pierced through said hollow X-rod, and
   said Y-rod is a hollow pipe and said second shaft is pierced through said hollow Y-rod.

6. The two dimensional drive system according to claim 5,
   wherein said hollow X- and Y-rods are filled with lubricant.

7. A two dimensional drive system comprising:
   a pair of X-guides being arranged parallel in an X-direction;
   a pair of Y-guides being arranged parallel in a Y-direction perpendicular to the X-direction;
   a first X-rod being arranged parallel to said X-guides, each end of said first X-rod is slidably attached to each Y-guides;
   a first Y-rod being arranged parallel to said Y-guides, each end of said first Y-rod is slidably attached to each X-guides;
   a first X-piston section being provided at the midway of said first X-rod, the diameter of said first X-piston section is greater than that of said first X-rod;
   a first Y-piston section being provided at the midway of said first Y-rod, the diameter of said first Y-piston section is greater than that of said first Y-rod;

an X-cylinder section having a first X-chamber in the X-direction through which said first X-rod is pierced whereby said X-cylinder section is capable of moving on said first X-rod, said first X-chamber being divided into two first X-subchambers by said first X-piston section;

a Y-cylinder section having a first Y-chamber in the Y-direction through which said first Y-rod is pierced whereby said Y-cylinder section is capable of moving on said first Y-rod, said first Y-chamber being divided into two first Y-subchambers by said first Y-piston section;

a second X-rod being provided on said X-cylinder section and arranged in the X-direction;

a second Y-rod being provided on said Y-cylinder section and arranged in the Y-direction;

a second X-piston section being provided at the midway of said second X-rod, the diameter of said second X-piston section is greater than that of said second X-rod;

a second Y-piston section being provided at the midway of said second Y-rod, the diameter of said second Y-piston section is greater than that of said second Y-rod; and a moving body having a second X-chamber in the X-direction through which said second X-rod is pierced, and a second Y-chamber in the Y-direction through which said second Y-rod is pierced, whereby said moving body is capable of moving on said second X- and Y-rods, said second X-chamber being divided into two second X-subchambers by said second X-piston section, said second Y-chamber being divided into two Y-subchambers by said second Y-piston section, wherein said moving body is capable of moving in a plane by selectively supplying fluid to said first X-subchambers, said second X-subchambers, said first Y-subchambers and said second Y-subchambers.

8. A two dimensional drive system, comprising:

a pair of X-guides being arranged parallel in an X-direction;

a pair of Y-guides being arranged parallel in a Y-direction perpendicular to the X-direction;

an X-rod having an X-chamber in the X-direction, said X-rod being arranged parallel to said X-guides, each end of said X-rod is slidably attached to each Y-guide;

a Y-rod having a Y-chamber in the Y-direction, said Y-rod being arranged parallel to said Y-guides, each end of said Y-rod is slidably attached to each X-guide;

an X-piston being movably provided in said X-chamber, said X-piston dividing said X-chamber into two subchambers;

a Y-piston being movably provided in said Y-chamber, said Y-piston dividing said Y-chamber into two subchambers; and a moving body being pierced by said X- and Y-rods so as to move thereon, said moving body is connected to said X- and Y-pistons so as to move on said X- and Y-rods together therewith, wherein said moving body is capable of moving in a plane by selectively supplying fluid to each subchamber.

9. The two dimensional drive system according to claim 8,
wherein said moving body is connected to said X- and Y-pistons by magnetic force.

10. The two dimensional drive system according to claim 9,
wherein said X- and Y-pistons are made of magnet, and said moving body is made of a magnetizable material.

11. The two dimensional drive system according to claim 8, further comprising:
X-restraining means for restraining the inclination of said X-rod with respect to the X-direction; and
Y-restraining means for restraining the inclination of said Y-rod with respect to the Y-direction.

12. The two dimensional drive system according to claim 11, wherein,
said X-restraining means comprising:
a pair of first timing belts being arranged parallel to said Y-guides; and
two pairs of first timing pulleys being engaged with each first timing belt, and
said Y-restraining means comprising:
a pair of second timing belts being arranged parallel to said X-guides; and
two pairs of second timing pulleys being engaged with each second timing belt.

13. The two dimensional drive system according to claim 11, wherein,
said X-restraining means comprising:
a pair of first racks being arranged parallel to said Y-guides;
a first shaft being arranged in the X-direction and pierced through said moving body, said first shaft being capable of turning on the axis thereof; and
a pair of first pinions being respectively fixed at each end of said first shaft, said first pinions being respectively engaged with each first rack, and
said Y-restraining means comprising:
a pair of second racks being arranged parallel to said X-guides;
a second shaft being arranged in the Y-direction and pierced through said moving body, said second shaft being capable of turning on the axis thereof; and
a pair of second pinions being respectively fixed at each end of said second shaft, said second pinions being respectively engaged with each second rack.

14. The two dimensional drive system according to claim 13, wherein,
said X-rod is a hollow pipe and said first shaft is pierced through said hollow X-rod, and
said Y-rod is a hollow pipe and said second shaft is pierced through said hollow Y-rod.

* * * * *